Patented Aug. 7, 1928.

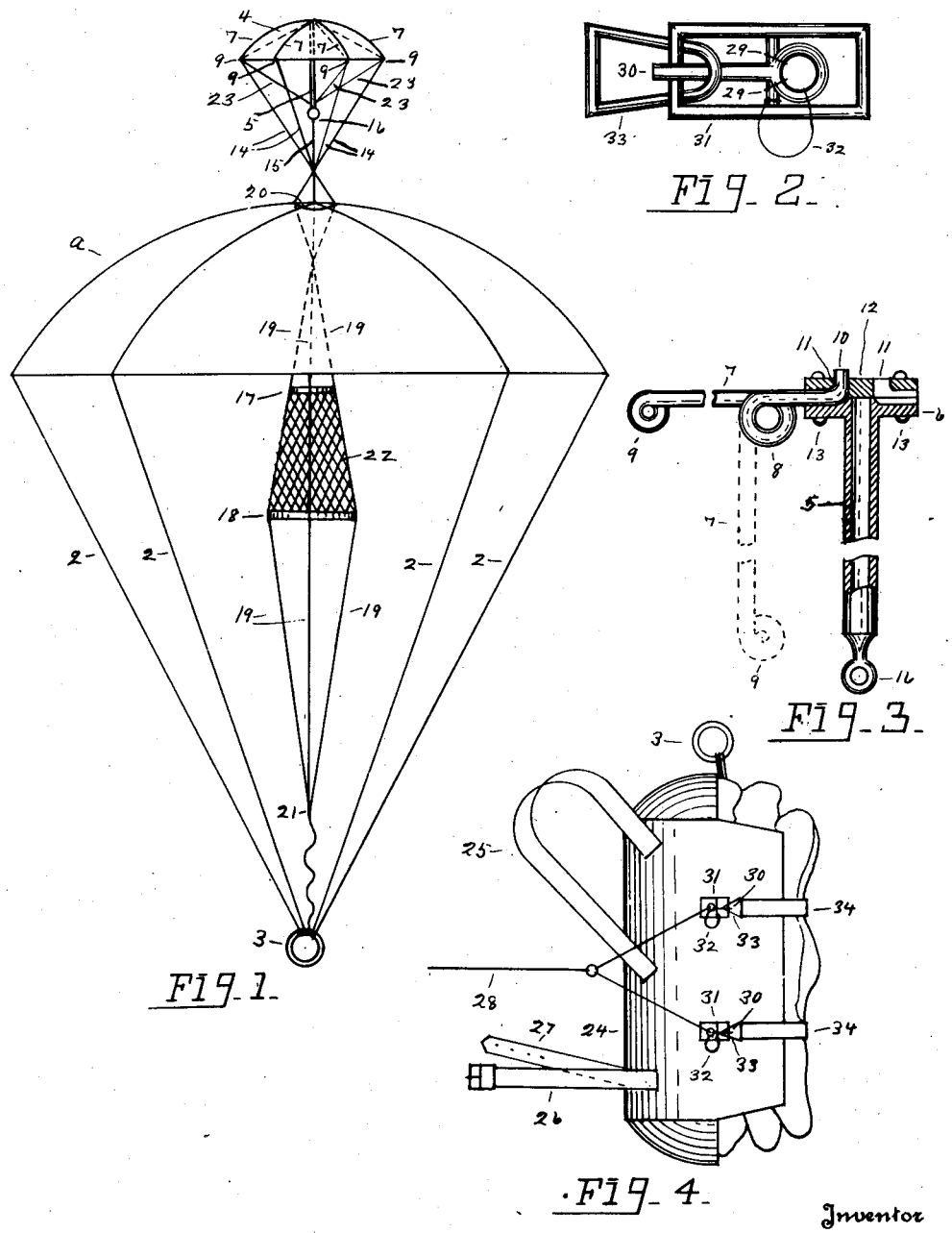

1,679,714

UNITED STATES PATENT OFFICE.

HALVOR OLSEN EIANE, OF DETROIT HARBOR, WISCONSIN.

PARACHUTE.

Application filed February 23, 1926. Serial No. 90,073.

My invention relates to improvements in a parachute; and the main objects are to provide a parachute, that can conveniently be carried on the back of an aerial traveler, and capable of quick and positive opening after being released from its pack.

I attain these objects by the use of a parachute, hereinafter more fully described and claimed, having reference to the accompanying drawing in which—

Figure 1, represents a side view of the complete parachute. Figure 2, is a detailed view of the release buckle. Figure 3, is a partly sectional side view of the frame work of the auxiliary parachute. Figure 4, represents a side view of the parachute in pack.

"A," in Figure 1, is the half-spherical body of the main parachute, which preferably is made of silk or other light fabric, and from which the cords 2, 2, converge and are secured to the ring 3. The auxiliary superposed parachute 4, is provided with a center staff 5, which in turn is provided with a flanged hub 6, to which spring-frames 7, 7, are radially secured. (Numerals relating to spring-frames 7, 7, in Figure 1 merely indicate points of locations.) The coil 8, consists of three or four turns, and permits the spring-frame 7, to be compressed to a position parallel with the staff 5. An eyelet 9, on the outer end of the spring-frame 7, allows cord and fabric to be attached to same. A ninety degree bend 10, on the inner end of the spring-frame 7, passes through a hole 11, in the hub-cap 12; and six similar spring-frames, radially mounted in the hub 6, and held firmly in place by the rivets 13, 13, constitute the frame-work of the auxiliary parachute 4. The cords 14, 14, (of which there are six,) and the center cord 15, secured in the eyelet 16, constitute the supporting connection between the auxiliary parachute 4, and the main parachute "A." Two flexible spreader rings 17 and 18, are held in suspended central position by the cords 19, 19, (four in number,) which are connected at its upper ends around the aperture 20, in the center of the main parachute "A," while its lower ends converge at a point 21, from which the cords 19, 19, are braided into a single line and secured to the ring 3. Netting 22, is provided between the two flexible spreader rings 17 and 18, and preferably made of strong twine, while the spreader rings are made of light spring-steel, or any other suitable material.

When the main parachute "A," is closed or stretched from the center of its aperture 20, and the ring 3, the cords 2, 2, and 19, 19, are then all even; and while in this position the fabric of the parachute "A," covers the suspended rings 17 and 18, but when the parachute "A," is open, or spread out, the lower ends of the suspension cords 19, 19, hangs slack as indicated in Figure 1. The auxiliary parachute 4, is provided with three stabilizers 23, 23, made of light suitable fabric, and radially attached to the staff 5, and the eyelets 9, 9, for the purpose of preventing side slipping in the air.

When in operation the following actions take place: The complete parachute is packed in a canvas bag 24, in such way that the auxiliary parachute 4, after being folded is packed in last; the aviator puts one arm into the shoulder strap 25, and his other arm into a second shoulder strap (not shown,) and buckles up the straps 26 and 27, around his body. The ring 3, is secured to a suitable harness on the aviator's body, (not shown,) and the release cord 28, (of which there also are two,) tied together in front of the aviator's body.

By pulling the cord 28, after jumping clear from an air craft, the light twine strings 29, 29, (shown in detail in Figure 2,) which hold the release pin 30, tied to the buckle 31, brake, and the release pin 30, withdrawn, which unlocks the buckle 31. In order to facilitate further actions of positive release, the cord loop 32, which connects the release pin 30, to the buckle 31, stretches out and swings the buckle 31, clear from the strap link 33. As all four release buckles, (two not shown,) function simultaneously, the straps 34, 34, are left entirely free from the bag 24, thus releasing first the auxiliary parachute 4, which by reason of its compressed spring frames 7, 7, spreads out and catches the air, and pulls the main parachute "A," out of its pack while the suspended flexible rings 17 and 18, keep the main parachute "A," partly open allowing the air to pass through its center and out through the aperture 20, thus creating a condition for quick and positive opening of the main parachute "A," by which the aviator can descend safely to the earth. The flexible nature of the rings 17 and 18, is merely for the purpose of convenience in packing, while the netting 22, is intended to prevent entanglements, and to assist in spreading the main parachute "A".

I do not intend to limit my invention to the exact drawing and description, as herein given, as many changes can be made without departing from the principles involved.

Having thus described my invention what I claim and desire to secure by Letters Patent is:

1. An auxiliary parachute having radially disposed spring frames firmly secured to the head of a center staff, said spring frames normally spread out and capable of being compressed to parallel lines with said center staff, suitable fabric covering attached to said spring frames and a plurality of radially disposed stabilizers of suitable fabric attached to said spring frames and center staff, and suitable cord connection to a main parachute.

2. The combination of an auxiliary parachute having radially disposed spring frames, firmly secured to the head of a center staff, suitable fabric covering attached to the spring frames, said spring frames normally spread out and capable of being compressed to parallel lines with said center staff, radially disposed stabilizers attached to said spring frames and center staff, and a main parachute having centrally suspended flexible spreader rings and netting, substantially as shown and described.

3. An auxiliary parachute having radially disposed spring frames rigidly secured to the head of a center staff, said spring frames normally spread out and capable of being compressed to parallel lines with said center staff, suitable fabric covering attached to said spring frames, and a plurality of radially disposed stabilizers of suitable fabric attached to said spring frames and center staff, and suitable connection to a main parachute.

4. The combination of an auxiliary parachute having radially disposed spring frames rigidly secured to the head of a center staff, suitable fabric covering attached to the spring frames, said spring frames normally spread out and capable of being compressed to parallel lines with said center staff, radially disposed stablizers attached to said spring frames and center staff, and a main parachute having centrally suspended flexible spreader rings and netting substantially as shown and described.

5. The combination of a main and auxiliary parachute of the type described, with a carrying case having a pair of detachable retaining straps provided with release buckles at each end adapted to keep said parachutes in pack, and means for releasing said retaining straps from said carrying case, substantially as shown and described.

HALVOR OLSEN EIANE.